United States Patent [19]

Patzschke et al.

[11] Patent Number: 4,943,359

[45] Date of Patent: Jul. 24, 1990

[54] PROCESS FOR APPLYING AN AQUEOUS, HEAT-CURABLE COATING TO CANS

[75] Inventors: Hans-Peter Patzschke; Albrecht Lüttenberg, both of Wuppertal; Hans-Jürgen Schlinsog, Wülfrath; Wolfgang Bogdan, Wuppertal, all of Fed. Rep. of Germany

[73] Assignee: Herberts Gesellschaft mit beschränkter Haftung, Wuppertal, Fed. Rep. of Germany

[21] Appl. No.: 180,595

[22] Filed: Apr. 6, 1988

Related U.S. Application Data

[63] Continuation of Ser. No. 5,689, Jan. 21, 1987, abandoned.

[30] Foreign Application Priority Data

Jan. 21, 1986 [DE] Fed. Rep. of Germany ..... 36015601

[51] Int. Cl.$^5$ .......................... C08L 63/00; C09D 5/44
[52] U.S. Cl. .................................. 204/181.6; 427/386; 523/100; 523/403; 523/404; 523/416; 523/424
[58] Field of Search ............... 523/414, 407, 408, 416, 523/100, 403, 404, 424; 204/181.6; 427/386

[56] References Cited

U.S. PATENT DOCUMENTS

| | | | |
|---|---|---|---|
| 4,025,692 | 5/1977 | Yamagishi | 428/418 |
| 4,316,922 | 2/1982 | Perine | 428/35 |
| 4,425,451 | 1/1984 | Sekmakas | 523/414 |
| 4,461,857 | 7/1984 | Sekmakas | 523/414 |
| 4,487,860 | 12/1984 | Winner | 523/408 |
| 4,503,173 | 3/1985 | Martino | 523/407 |
| 4,508,765 | 4/1985 | Ring | 427/386 |
| 4,522,961 | 6/1985 | Martino | 523/407 |

FOREIGN PATENT DOCUMENTS

| | | |
|---|---|---|
| 174628 | 3/1986 | European Pat. Off. |
| 188689 | 7/1986 | European Pat. Off. |
| 2638464 | 12/1980 | Fed. Rep. of Germany |
| 3304940 | 8/1984 | Fed. Rep. of Germany |

*Primary Examiner*—C. Warren Ivy
*Attorney, Agent, or Firm*—Schweitzer & Cornman

[57] ABSTRACT

Aqueous, heat-curable coating material, containing as vehicle 85 to 40 weight percent of a mixture of a fatty acid-free, acidic epoxide resin phosphate ester with an acid number of 10 to 150, prepared from an epoxide group-containing polyglycidyl ether and/or a polyglycidyl methacrylate resin with more than 1.3 epoxide groups per molecule and an epoxide equivalent weight of 180 to 5,000 and a phenolic resin-modified, carboxyl group-containing, oil-free polyester with an acid number of 15 to 175 and an OH number of 15 to 175, 0 to 25 weight percent of an epoxide resin graft copolymer with an acid number of 30 to 200, prepared from an epoxide group-free reaction product of fatty acid-free polyglycidyl ethers with more than 1.3 epoxide groups per molecule and an epoxide equivalent weight of 1,000 to 5,000 with $\alpha,\beta$-unsaturated monocarboxylic acids and 5 to 40 weight percent of a fully etherified amine-formaldehyde condensation resin and/or a fully etherified phenol-formaldehyde condensation resin with at least 2 reactive sites per molecule; its use for coating substrates, as well as methods for coating objects with these coating materials and objects coated therewith.

8 Claims, No Drawings

PROCESS FOR APPLYING AN AQUEOUS, HEAT-CURABLE COATING TO CANS

This is a continuation of Ser. No. 005,689, filed Jan. 21, 1987, now abandoned.

The invention relates to an aqueous, heat-curable coating material containing a vehicle based on epoxide resin and polyester resin in admixture with an aldehyde condensation resin as cross linking agent as well as with organic solvents in an amount up to 20 weight percent based on the total weight of the coating material, optionally conventional lacquer additives as well as, optionally, pigments and/or filler.

The invention moreover relates to the use of this coating material for coating substrates, a method for coating the substrate, especially by means of the anodic electrode position coating process (EDC), and objects coated according to this method. Coating materials of the initially mentioned type are known. For example, in the European Auslegeschrift No. 01 44 872 (U.S. Pat. No. 4,487,861) there is a description of an aqueous polymer composition, which contains an epoxide resin/acrylate graft copolymer and an epoxide resin phosphate ester. The composition can also be mixed with an aminoplastic resin. It serves as coating composition, but leads to coatings, which are not adequate qualitatively for coating cans, especially tin plate cans, which are used to preserve foods. A coating process by electrophoresis is not described.

In the European Auslegeschrift No. 01 74 628, mixtures of epoxide resin phosphate esters and acrylate resins are deposited electrophoretically. They lead to can coatings, which are unsuitable for holding and storing foods.

In the European Patent No. 188,689, epoxide resin phosphate esters are described, which are combined with resins, which are not dispersible with a base in water. It is a question here of acrylate resins, butadiene oils, polyesters, alkyl resins or polyurethanes, which essentially no longer contain any free acid groups. Experimental attempts show that suitable, smooth films cannot be produced by electrophoretic coating, especially of tin plate cans.

The increasingly stringent demands to protect the environment lead to the development of aqueous coating materials, which contain only small amounts of organic solvents. It is particularly difficult to use such aqueous coating materials for the known electrode position coating process (EDC), especially for lacquering containers such as beverage and food cans. The cause of this difficulty lies, on the one hand, in the equipment (cf. German Auslegeschrift No. 3,304,940) and, on the other, in the development of suitable coating materials.

Electrophoretic depositions with the known water-dilutable lacquers showed that these frequently tend to develop disruptive electrical discharges. The stoved films have too high a porosity which leads to pitting during the storage of beverages and foods. These disadvantages occur when carboxyl group-containing and phosphoric acid-containing acrylate resins, polyesters or epoxide resins are combined with melamine resins or phenolic resins. To obtain satisfactory EDC coatings, storage stable, aqueous lacquers must be to be found, which have a sufficient throwing power, so that they can be deposited satisfactorily without disruptive electrical discharges, and which form stoved films with the lowest possible porosity and meet the health regulations of the various countries, for example, those of the FDA of the U.S.A. and of the BGA of the Federal Republic of Germany.

The invention is based on the task of avoiding these disadvantages and of improving especially the electrical, mechanical and chemical properties of the bath and of the deposited and stoved film.

Surprisingly, it was discovered that this task can be accomplished with the coating material defined in the claims.

The object of the invention accordingly is a aqueous, heat-curable coating material of the initially mentioned class, wherein said coating material contains, as binder.

85 to 40 weight percent of a mixture of a fatty acid-free, acidic epoxide resin phosphate ester with an acid number of 10 to 150 and especially of 15 to 150, prepared from an epoxide group-containing polyglycidyl ether and/or a polyglycidyl methacrylate resin with more than 1.3 epoxide groups per molecule and with an epoxide equivalent weight of 180 to 4,000 and especially to 2,500, and a phenolic resin-modified, carboxyl group-containing, oil free polyester with an acid number of 15 to 175 and an OH number of 15 to 175 (component A)

0 to 25 weight percent and preferably 5 to 25 weight percent of an of epoxide graft copolymer with n acid number of 30 to 200, prepared from an epoxide group-free product of the reaction of fatty acid-free polyglycidyl ethers with more than 1.3 epoxide groups per molecule and an epoxide equivalent weight of 1,000 to 5,000, and especially of 1,000 to 3,000. with $\alpha,\beta$ unsaturated monocarboxylic acids (component B)

5 to 40 weight percent of a fully etherified amine-formaldehyde condensation resin and/or a fully etherified phenol-formaldehyde condensation resin with at least 2 reactive sites per molecule (component C).

Preferred quantitative relationships are:
component A: 75 to 45 weight percent
component B: 10 to 20 weight percent
component C: 10 to 35 weight percent The fatty acid free, acidic epoxide resin phosphate ester, used in component A, has an acid number of 10 to 150. Preferably, this number is between 15 and 150. It has turned out that the acid number of the epoxide resin phosphate ester advantageously has lower values than do the acid numbers of the remaining components of modified oil-free polyesters of component A and/or of the epoxide graft copolymer of component B. It is therefore preferred, if the acid number of the epoxide resin phosphate ester is 10 to 40, preferably 20 to 40, for instance 10 to 35 or 12 to 30.

The acidic epoxide resin phosphate ester of component A preferably has a molecular weight of 2,500 to 7,000 and especially of 3,000 to 5,000.

The epoxide equivalent weight of the epoxide resin phosphate ester used in component A naturally then, corresponding to the preferred acid numbers, is preferably of the order of 500 to 4,000. It may however be advantageous, depending on the acid number, to choose values of 1,500 to 5,000 or values of 1,800 to 4,000 and especially values of 2,000 to 3,500, the last-mentioned higher values for the epoxide equivalent weight naturally occurring preferred lower acid numbers. Epoxide equivalent weights of, for example 180 to 2,5000 are also suitable.

If the epoxide resin phosphate ester, used in accordance with the above-mentioned preferred embodiment as component A, has acid numbers in the lower range named, it is necessary, in order to obtain a stable coating material, that the remaining components, such as the phenolic resin-modified oil-free polyester (further constituent of component A) and/or the epoxide resin graft copolymer (component B) have acid numbers, which fall in a higher range. The epoxide resin phosphate esters with a low acid number and a high molecular weight, which are preferably used for can lacquers, can be deposited electrophoretically with a smooth surface only if they contain at least a small amount of phenolic resin-modified polyester or acrylated epoxide resin with a higher acid number.

Pursuant to the invention, compounds with a relative low acid number of, for example 12 to 30 are preferably used for component A in admixture with compound, which have a higher acid number of, for example, 35 to 100. Under some circumstances, compounds of component A with a very low acid number are not readily soluble in water. Adequate miscibility is, however, achieved by mixing them with component A and component B of higher acid number. A sufficient miscibility with water can also be achieved for a component A with a relatively low acid number of, for example 10 to 40 by conferring a relatively high OH number of, for example, 100 to 200 on this component.

The acid number of the phenolic resin-modified carboxylic group-containing oil-free polyester, additionally used in component A, preferably is 30 to 110 and particularly 35 to 70.

Preferably, component A is a mixture of 40 to 90. for example of 40 to 80 weight percent of the fatty acid-free acidic epoxide resin phosphate ester and of 10 to 60, for example, of 20 to 60 weight percent of the phenolic resin modified, carboxyl group-containing oil-free polyester.

Suitable as a base resin in component A is a neutralized reaction product of phosphoric acid, especially of orthophosphoric acid, with epoxide group containing polyglycidyl ethers and/or polyglycidyl methacrylates. Their preparation is known, for example, from the German Auslegeschrift No. 2,757,733 (U.S. Pat. Nos. 4,164,487 and 4,289,812). Within the scope of this invention, polyglycidyl ethers are understood to be preferably resins of the general, idealized formula

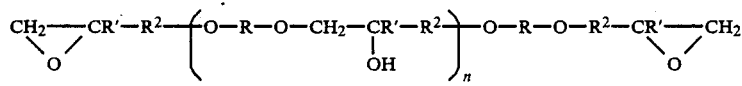

with

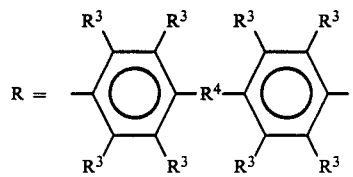

in which
R' =—$C_mH_{2m+1}$ and/or preferably —H,
$R^4$=—$SO_2$—, —O—, and preferably —$CR^3_2$—,
$R^2$=—$(CR^1_2)_m$— and preferably —$CH_2$—,
$R^3$ =halogen or R'
n=0 to 15 and preferably 6 to 13, and
m=1 to 8 and preferably 1.

Examples are the reaction products of different molecular weights from dihydroxy-diphenylpropane (bisphenol A) or dihydroxy-diphenylmethane (bisphenol F) and epichlorohydrin and/or methylepichlorohydrin. Products of higher molecular weights can also be prepared by other methods, such as the reaction of low molecular weight polyepoxides with bisphenol A. These polyglycidyl ethers have an epoxide equivalent weight of 180 to 5,000, particularly of 1,500 to 5,000 and especially of 2,000 to 4,000. They may be partially or completely hydrogenated or used in mixtures with different epoxide equivalent weights or with different structures. Also suitable are polyglycidyl ethers of phenolic novolak resins, by means of which the functionality can be increased from 2 to about 6 glycidyl groups per molecule. The functionality of the resins can also be decreased by reaction with monofunctional alkylphenols or monocarboxylic acids, preferably α-branched monocarboxylic acids. For elastification, a portion of the described polyglycidyl ether may be replaced by aliphatic polyglycidyl ethers of the formula

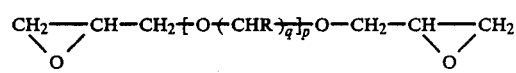

in which R=H or a low molecular weight, optionally variously substituted alkyl group and q=2 to 6 and P=3 to 50. Examples are the reaction products of epichlorohydrin with polypropylene glycol or polybutylene glycol of different molecular weights. The epoxide resins may also be modified or prepared stepwise by reacting longer-chain dicarboxylic acids, such as isophthalic acid, cyclohexanedicarboxylic acids, adipic acid or sebacic acid with long-chain polyalcohols such as 1,6-hexanediol. glycerin, monoanhydropentaerythritol, polytetrahydrofuranediol, polycaprolactonediol, polycaprolactamdiol or polybutadienediol, as well as with NCO terminated reaction products of polyalcohols and polyisocyanates or half-blocked diisocyanates. The reaction usually is carried out with 70 to 90% phosphoric acid solutions in a closed pressure vessel for 3 to 6 hours at temperatures from 110° to 130° C., about 0.3 to 1.2 phosphoric acid groups and preferably fewer than 1 phosphoric acid group per oxiran ring being used. Approximately 0.5 to 3 weight percent of phosphoric is reacted with 100 g of epoxide resin. In addition, proportion of water, which is used for the addition reaction to the oxiran groups and for the hydrolysis of the phosphate diesters and triesters formed, determines the dilutability with water. The amount of unreacted phosphoric acid, contained in the end product, should be as small as possible. As volatile bases for the neutralization, it is particularly advantageous to use low molecular weight volatile amines of the formula —$NR_2$. in which R represents —H, methyl and/or ethyl. This is described in detail in the German Auslegeschrift No. 2,757,733 (U.S. Pat. No. 4,164,487).

As epoxide group-containing resins (component A), polymethacrylate resins may also be used which, aside from methacrylate esters with $C_1$ to $C_{15}$ alcohol groups and/or optionally substituted vinyl aromatic groups, contain copolymerized, epoxide group-containing unsaturated monomers.

Suitable for this are glycidyl ethers of methacrylic acid, as well as of maleic and/or fumaric acid, glycidyl ethers of unsaturated alcohols, such as vinyl alcohol, allyl alcohol and/or hydroxalkyl methacrylate, glycidyl compounds of methacrylamide, of maleic and/or fumaric diamides or maleic imide. The resins are prepared by free radical solution polymerization at temperatures of 60° to 160° C.

As component A(ii) carboxylic group-containing, phenolic resin-modified polyesters can be used, as described in the Austrian Auslegeschrift No. 280,605, the German Auslegeschrift No. 2,638,464 and/or the EP-B-No. 0 062 786. For these, polyols or hydroxyl group-containing precondensates with, preferably, 2 to 4 OH groups per molecule are reacted with higher molecular weight, hydroxyl group-containing phenol ethers in such a way, that they can be converted by neutralization into a water-dilutable form. To achieve optimum properties, the polyester resins used must have an average molecular weight $\overline{M}_n$ of at least 1,500 and, in each case, contain 0.3 to 3 and preferably 0.8 to 2 hydroxyl and carboxyl equivalents per 1,000 g of polyester. By these means, polyester intermediates, which contain no unsaturated fatty acids, are produced by methods that are known from polyalcohols, such as 1,6-hexanediol, neopentyl glycol, cyclohexanedimethanol, trimethylolpropane, glycerin and/or pentaerythritol, and polycarboxylic acids, such as adipic acid, isophthalic acid, cyclohexane-1,4-dicarboxylic acid or trimellitic anhydride. These oil-free polyesters are reacted in the absence of acidic catalysts with mononuclear or polynuclear phenols, especially with alkylphenols at 60° to 160° C. and especially at 100° to 130° C. and with aldehydes. Preferred phenols are monoalkylphenols, such as p-tert.-butylphenol, p-cumylphenol, nonylphenol, phenylphenol or bisphenol A (1,1-bis-4-hydroxyphenyl-propane), which are incorporated in amounts of 0.5 to 50 weight percent. Especially favorable results with respect to the resistance properties of the stoved films to aggressive solvents are achieved, if said phenols are replaced partly or completely by phenolcarboxylic acids. Suitable for this purpose are for example, 4,4-bis-(4-hydroxyphenyl)-pentanoic acid, glycolic acid derivatives of diphenols, such as the 2-(4-hydroxyphenyl)-2-(carbethoxyphenyl)-propane or salicylic acid. As is customary in phenolic resin chemistry, formaldehyde is preferably used as aldehyde in an amount of 0.5 to 3 moles per mole of phenolic hydroxyl group. According to a different method, such condensation products can be prepared by reacting a resol from mononuclear and/or polynuclear phenols with carboxyl group-containing polyesters at 80° to 240° C. which have an average molecular weight of $\overline{M}_n$ of 300 to 1,500 and an acid number of 50 to 150 mg of KOH/g of solid resin.

The phenolic resin-modified polyester preferably has an acid number of 30 to 110 and especially of 35 to 70.

As component B, 5 to 25 weight percent of carboxyl group-containing epoxide resins with an acid number greater than 30, preferably of 45 to 150 and especially of 65 to 110 are used, which are prepared-by graft polymerization with $\alpha,\beta$-unsaturated monocarboxylic acids, optionally with addition of methacrylate esters and/or (substituted) vinyl aromatic compounds. Their epoxide equivalent weight is 1,000 to 5,000 and preferably 1,000 to 3,000. In this connection, essentially all oxiran rings are reacted first of all with an H-acid compound. These are monofunctional compounds, which do not enlarge the molecule, such as benzoic acid or tert-butylbenzoic acid, alkyl- or arylphenols, such as tert.-butylphenol or phenylphenol, monoalcohols and/or monoepoxides. When bifunctional H-acid compounds, such as isophthalic acid or bisphenol A, are used, there is molecular enlargement. The increase in the molecular weight is, moreover, controlled by the relationships of the amounts used. Grafting at the aliphatic carbon atom of the modified epoxide resin, which is dissolved in organic solvents such as butanol or butoxyethanol, occurs at temperatures of 110° to 130° C. on addition of more than 3 weight percent preferably of 4 to 8 weight percent and particularly of 6 to 7 weight percent of benzoyl peroxide or of initiators with a similar effect. Preferably, epoxide resins with a higher epoxide equivalent weight of, for example 2,000 to 4,000 are selected to support the graft polymerization. At least 1.5, preferably at least 5 parts by weight and particularly at least 10 parts by weight of monomer mixture are used per 100 parts by weight of epoxide resin. Superior properties are obtained when component B contains epoxide resin in amounts of more than 40 weight percent, preferably of more than 50 weight percent and particularly of between 60 and 90 weight percent. The preparation of these products is described in the German Auslegeschrift No. 2,721,822 and the German Auslegeschrift No. 2,721,823 (U.S. Pat. Nos. 4,308,185 and 4,212,781). Acrylated epoxide resins, which are graft polymerized only with acrylic acid or methacrylic acid and styrene, are preferred.

To cross link the carboxyl and hydroxyl groups contained in components A and B, 5 to 40 weight percent of one or several aldehyde condensation resins are added as thermal cross-linking agents. These are understood to include amine- and phenol-formaldehyde condensation resins, corresponding to the state of the art, as well as copolymers, which can react by way of incorporated reactive monomers. These cross-linking agents (component C) are dispersible in the inventive vehicles (A and B) and may optionally, to improve the solubility contain acid groups, which give the resin an acid number up to about 80 mg of KOH per g of solid resin.

Amine formaldehyde condensation resins are formed by the reaction of aldehydes with urea, N-alkyl urea, dicyandiamide, various triazines such as melamine, benzoguanamine and acetoguanamine or their mixtures. The aldehydes may, moreover, be monofunctional, as well as polyfunctional. Examples of these are formaldehyde and its polymerization products such as paraformaldehyde, polyoxymethylene and trioxane, or aliphatic and cyclic aldehydes, such as glyoxal, acetaldehyde, acrolein, propionaldehyde, butyraldehyde and furfural. Resins with different molecular weights and different reactivities are obtained, depending on the reaction conditions and the degree of methylolization. The condensation with formaldehyde, furfural, paraformaldehyde, polyoxymethylene or trioxane is generally carried out with the addition of weak acids or bases as catalyst. Strong acids are used for the condensation with acrolein, glyoxal, acetaldehyde, propionaldehyde or butyraldehyde. The primary reaction product is neutralized here; aldehyde is then added and the reaction is continued with the addition of weak acids or bases. The preferred aldehyde is formaldehyde. The alcohol groups, preferably methylol groups, of the aldehyde condensation product are etherified partly or, preferably, completely with alcohols. Amine formaldehyde resins are preferred, the bulk of the methylol groups of which are reacted with monoalcohols or their mixtures.

Especially preferred are methanol, ethanol, propanol, butanol, heptanol, benzyl alcohol and other aromatic alcohols, cyclic alcohols, such as cyclohexanol, or monoethers of ethylene glycols, such as ethoxyethanol or butoxyethanol. If alcohols with more than 4 carbon atoms are to be incorporated, the methylol group is etherified first with a lower molecular weight alcohol and the higher molecular weight alcohol is introduced subsequently by transetherification. The preferred alcohols are lower molecular weight aliphatic monoalcohols, such as methanol and/or butanol. Especially preferred are melamine resins, which are reacted with 3 to 6 moles of formaldehyde and subsequently etherified completely with methanol. The resins are prepared according to the state of the art and offered by many companies as products for sale. By etherifying with hydroxycarboxylic acids such as hydroxybenzoic acid, salicylic acid or dimethylolpropionic acid, carboxyl group containing melamine resin types are formed: unsaturated melamine resin types are formed if hydroxyalkyl methacrylates or allyl alcohol is used.

The preferred phenolic resins are reaction products of phenol or substituted phenols with different aldehydes in molar excess in the presence of alkaline catalysts (resol type). Examples of phenolic compounds are phenol, cresol, xylenol, resorcinol and substituted phenols such as p-tert.-butylphenol. p-tert.-amylphenol, p phenylphenol. isothymol, cardanol or also multinuclear phenols such as dihydroxy-diphenylpropane (bisphenol A) or dihydroxy-diphenylmethane. Further starting materials are the phenolic novolak resins, which optionally are defunctionalized with monocarboxylic acids, preferably α-branched monocarboxylic acids, monophenols, which are substituted especially with $C_2$ to $C_{18}$ alkyl groups or also monoepoxides such as α-monoepoxide alkanes, monoglyceride ethers or monoglyceride esters. As aldehydes, formaldehyde and its polymerization products are used, such as paraformaldehyde, trioxymethylene, polyformaldehyde or also hexamethylenetetramine. Acetaldehyde, paraldehyde, and metaldehyde, as well as butyraldehyde or furfural are well suited. The methylol groups are etherified partly or preferably completely with methanol, ethanol, propanol and/or butanol. Resins are preferred, which are reacted with excess formaldehyde per phenolic group that is, with about 1.1 to 2.5 moles of formaldehyde in an alkaline medium. Resins based on bisphenol A, which are reacted with about 4 formaldehyde molecules and etherified completely with butanol are especially preferred. Water-insoluble, as well as carboxyl group-containing phenolic resins of different molecular weights may be used. Phenolcarboxylic acids, suitable for this purpose are, for example, 4,4-bis-(4-hydroxyphenyl)-pentanoic acid, glycolic acid derivatives of bis-phenols, such as the 2-(4-hydroxyphenyl)-2-(carbethoxyphenyl)-propane, or salicylic acid. Optionally, very low molecular weight, optionally unsaturated methylolphenol ethers may also be used, such as trimethylolphenol allyl ether (trademark: Methylon Resins).

Reactive copolymers, which can cross link with carboxyl groups or hydroxyl groups of components A and B, are prepared by the copolymerization of N-methylol ethers of methacrylamide or methylacrylamidoglycolate methyl ether. Besides these reactive monomers, methacrylate esters, hydroxyalkylmethacrylates or optionally substituted vinyl aromatic compounds are also copolymerized. The incorporation of N-methylol ethers can also be accomplished by a polymer-like reaction of copolymerized methacrylamide with formaldehyde and monoalcohols. The resins generally are prepared by solution polymerization at a solids content of 60 to 90% with addition of free radical initiators.

The vehicles are neutralized individually or in the mixture with the neutralizing agents and optionally diluted in the presence of solvents with deionized or distilled water. As neutralizing agents, readily volatilized amines may, for example, be used, such as ammonia, and low molecular weight primary secondary or tertiary alkylamines, which readily leave the film during storing. However, amines and/or aminoalcohols, which are not readily volatilized, may also be used, if they have the ability through suitable substituents such as hydroxyl groups, to react firmly with the film. Examples of amines are diethylamine, triethylamine, n-butylamine, morpholine, N-methylmorpholine, aminoethanol, diisopropanolamine, 2-dimethylamino-2-methylpropanol, 2 amino-2-methyl-1-propanol, tris(hydroxymethyl)aminomethane, methyldiethanolamine, and triethanolamine. The pH of the lacquers preferably is between 7.0 and 8.5.

Suitable as solvents are primary, secondary and/or tertiary alcohols ethylene or propylene glycol mono- or diethyl ethers, diethylene- or dipropylene glycol monoether or diether, diacetonealcohol or also small portions of solvents, which are not dilutable with water, such as naphtha hydrocarbons, hexyl glycol, phenoxypropanol and/or 2,2,4-trimethyl-1,3-pentanediol monoisobutyrate. They are necessary in order to obtain a refill material with a workable viscosity, to prevent surface disorders in the film applied and to achieve a smooth flow. The organic solvent content in the workable lacquer is kept as low as possible. Electrodeposition lacquers advisably contain less than 15 weight percent and preferably less than 5 weight of solvents, because the throwing power, required for the lacquering, worsens with increasing solvent contents.

In accordance with the invention, the solids content of the bath is 5 to 60 weight percent after dilution with water. On adjusting the lacquer to a higher solids content of 25 to 50 weight percent and preferably of 30 to 45 weight percent, water-dilutable stoving finishes are obtained, which can be applied on the object to be lacquered by dipping and draining, spraying, rolling etc. On the other hand, if the dilution is carried out to a solids content of 5 to 30 weight percent and preferably of 8 to 20 weight percent, the lacquer is suitable for electrophoretic deposition.

As the solids content is increased, the bath conductivity rises and the deposition equivalent (amps×sec/g) is decreased, as a result of which the throwing power can be increased. At the same time, due to the high concentration of lacquer-forming ions, the specific layer resistance passes through a maximum. Preferably, it is $1,000-5,000 \times 10^5$ ohm×cm.

The bath temperature is between 20° and 35° C. The throwing power increases with decreasing temperature. Temperatures below 20° C. are uneconomic, because the heat produced by the EDC process must be dissipated once again by the use of much cooling water. Temperatures above 35° C. make it difficult to control the bath, because too much solvent evaporates and hydrolysis of the vehicle system produces fluctuations in the electrical data.

The coating material additionally may contain conventional lacquer auxiliaries such as catalysts, leveling agents, antifoamers, lubricants, etc. Naturally, additives should be selected, which do not enter into any interfering reactions with water at the pH of the bath, do not introduce any interfering foreign ions and, on prolonged standing, do not precipitate in a form in which they cannot be redispersed.

The vehicles may be used pigmented or unpigmented. As pigments and fillers, those materials may be used which, because of their small particle size of less than 10 μm and especially of less than 5 μm. can be dispersed stably in the lacquer and can be redispersed once again after standing. They must not contain any interfering foreign ions nor react chemically with water or the neutralizing agent. The pigmentation may be white as well as colored: white is preferred. By additionally incorporating interference pigments, it is possible to achieve metal effect lacquerings, such as an aluminum, silver, brass, copper and gold effects. Pigments, such as titanium dioxide, are ground in a concentrated mill base and then adjusted with additional vehicle to a pigment: vehicle ratio of about 0.1:1 to 0.7:1. The throwing power is increased by the incorporation of pigments.

Instead of pigments, finely powdered, insoluble resins, such as powdered polyhydrocarbon resins, epoxide resins or blocked polyisocyanates may be used, the amount added being selected so that the maximum of the layer resistance is not exceeded. Vehicle, pigment content, bath solids, solvent content, selection and amount of neutralizing agent are matched to the coating conditions, such as the bath temperature and the deposition voltage and time, so that a complete coating is achieved in the electrodeposition bath (EDC bath) and the coating, after stoving, is pore free in the interior of the can at layer thicknesses of at least 3 μm, preferably of at least 4 μm and particularly of at least 5 μm and not more than 10 μm and especially not more than 7 μm.

The electrodeposition coating process (EDC) takes place in an open immersion bath, which is stored and recirculated constantly to avoid deposition of dispersed resin particles and pigments. The coating process is carried out with a direct current of 50 to 500 volt, the object to be coated being connected in the circuit as anode. The coating time is between 1 second and 3 minutes. Packing cans are coated for very short times (about 5 to 20 seconds) and normal industrial objects with cavities are coated for 2 to 3 minutes. The thickness of the layer is controlled by the time and voltage selected. After rinsing optionally with ultrafiltrate and water, the lacquer is stoved for 1 second to 30 minutes at temperatures of 150° to 250° C. The thin layers of the beverage cans are hardened by a brief shock drying at high temperatures (1 second to 250 seconds at 200° to 230° C.). Larger industrial objects with their thicker layer of lacquer require a longer time to heat the mass and are then stoved at a lower temperature, for example, for 25 minutes at 175° C.

The lacquers are suitable especially for the electrodeposition coating of beverage and food cans anH provide smooth, hard and elastic films with good adhesion, which practically no longer contain any pores and behave flawlessly in storage experiments. The porosity is determined by filling the test can with an electrolyte, by applying a test voltage of 4 volt and determining whether the insulating effect of the film is adequate over a period of 30 seconds. In storage experiments with filled cans, it is determined whether iron ions migrate into the solution or when pitting occurs. In each case, mixtures of the individual components can be used.

The viscosity of the coating material is adjusted in a manner known per se to correspond to the desired type of application. Those skilled in the art know that relatively low viscosities are appropriate for electrodeposition coating, while higher viscosities are necessary or appropriate for other types of application, such as dipping and draining, flooding, spraying, application by roller or pouring. Spraying can be carried out, for example, with the help of air-less or compressed-air spray guns. In electrostatic lacquering, the individual lacquer droplets are charged by the high voltage applied and transferred to the workpiece by means of their electrical charge. To prevent a breakdown of the electrical field at the spraying organ, external high-voltage electrodes are used in a known manner. As is customary for water-based lacquers, pressure or rotational energy is used in a known manner to achieve good atomization.

Epoxide Resin Phosphate Ester A 1

Polyglycidyl ether (914 g), based on bisphenol A, with an epoxide equivalent weight of 2250, is dissolved with heating to 125° C. in 440 g of butoxyethanol. Orthophosphoric acid (85%, 19.2 g) is diluted with 100 g of butoxyethanol and added within 30 minutes with vigorous stirring at 125° C. This temperature is maintained for 2 hours until the orthophosphoric acid has reacted completely and is then lowered to 115° C. Into the pressure-tight closed system, 10 g of water are then added carefully below the surface, the pressure temporarily rising slightly. The temperature is subsequently maintained at 115° C. for 2 hours to complete the hydrolysis. After addition of 10 g of 2-dimethylamino-2-methylpropanol (80% in water), the product is diluted with 1,426 g of deionized water.

Final values:
  solids content: 32 weight percent (after heating for 1 hour in a forced-air oven at 150° C.)
  acid number: approx. 20 (mg of KOH per g of solid resin)

Phenolic Resin-Modified Polyester A 2

In a 3-neck flask equipped with stirrer, thermometer and condensate trap and under an inert gas atmosphere, a polyester is prepared from 3 moles of 1,6-hexanediol, 1 mole of adipic acid, 1 mole of trimethylolpropane, 1 mole of isophthalic acid and 1 mole of trimellitic anhydride by increasing the temperature slowly from 160° to 220° C., while splitting off the water of reaction.

Characteristic values:
  acid number: approx. 70 mg of KOH per g of solid resin
  viscosity: 460 mPas or the 50% resin solution in butoxyethanol at 25° C.

This polyester (1178 g) is reacted at 100° to 110° C. with 635 g of a bisphenol resol, which was prepared using a known method by the alkaline condensation of 1 mole of bisphenol A with 3 moles of formaldehyde. After the viscosity, measured as a 50% solution in butoxyethanol at 25° C., reaches a value of 1450 mPas, the product is diluted with butoxyethanol to a solids content of 80 weight percent and filtered.

Acrylated Epoxide Resin B 1

Polyglycidyl ether (862 g), based on bisphenol A and with an epoxide equivalent weight of 2,250, is dissolved in 250 g of butoxyethanol and 380 g of n-butanol heated to 125° C. A monomer mixture of 130 g of methacrylic acid, 110 g of styrene and 16 g of benzoyl peroxide is added uniformly at this temperature over a period of 2 hours. To complete the polymerization, stirring is continued for a further 3 hours at about 125° C. After addition of 125 g of 2-dimethylamino-2 methylpropanol (80% in water), the product is diluted with 2620 g of deionized water.

Final values:
 solids content: 24 weight percent (after heating for one hour in a forced-air oven at 150° C.)
 acid number: approximately 80 (mg of KOH per g of solid resin)

Phenolic Resin C 1

Paraformaldehyde (91%, 462 g), 830 g of distilled water, 66.7 g of methanol and 1.5 g of NaOH were mixed and heated rapidly to 60° C. with stirring. This temperature is maintained until the solution is clear. The solution is cooled to room temperature and 798 g of bisphenol A are dispersed into it. After the addition of 723 g of 33% caustic soda solution, the temperature is maintained at about 40° to 45° C., until the free formaldehyde content no longer decreases. After cooling, 1,300 g of n-butanol are added to the batch, from which about 300 mL of a butanol- water mixture are then distilled off at 35° C. After the addition of 80 g of toluene, the water formed is azeotroped out as the temperature is raised slowly from 95° to 115° C. The product is then concentrated under vacuum to a solids content of about 65 weight percent
 solids content: 66.6 weight percent (1 hour at 120° C.)
 viscosity: 28 Pas at 25° C.

Melamine Resin C 2

A reaction mixture of 1 mole of melamine, 4.6 moles of formaldehyde (used in the form of 91% paraformaldehyde) and 7 moles of butanol is heated to the boiling point in the presence of 0.05 weight percent of phthalic anhydride and condensed for 1 hour, the water of reaction being removed. The temperature is now lowered to 90° C. and 5 weight percent of xylene are added. The reaction mixture is heated to the boiling point once again and condensed azeotropically until 2 g of the product are compatible with 15 mL of a mixture of 100 parts by weight of n-heptane and 20 parts by weight of toluene. The reaction product subsequently is concentrated to a baked residue (1 hour at 120° C.) of 55 weight percent. The resin solution, so prepared, has a viscosity of 150 to 250 mPas, is compatible with a mixture of 100 parts of n heptane and 20 parts of toluene (2 g in 10 to 20 mL), and has an acid number $\leqq 1$ and a Hazen color number of $\leqq 20$.
 solids content: 56 weight percent

EXAMPLE 1

Epoxide resin phosphate ester A 1 (306 g) is mixed with 35 g of phenolic resin-modified polyester A 2 and 37 g of phenolic resin C 1. The mixture is then neutralized with 5 g of 2-dimethylamino 2-methylpropanol (80% in water) and diluted to 1 liter with deionized water.

Ratio of the components (solid to solid)
 A1:A2:C1 = 65:19:16

EXAMPLE 2

Epoxide resin phosphate ester A 1 (281 g) is mixed with 24 g of phenolic resin-modified polyester A 2, 94 g of acrylated epoxide resin B 1 and 32 g of melamine resin C 2. The mixture is then neutralized with 4 g of 2-dimethylamino-2-methylpropanol (80% in water) and diluted to with 1040 g of deionized water.

Ratio of the components (solid to solid)
 A1:A2:B1:C2 = 60:13:15:12

EXAMPLE 3

Epoxide resin phosphate ester A 1 (293 g) is mixed with 75 g of acrylated epoxide resin B 1, 36 g of phenolic resin-modified polyester A 2 and 40 g of phenolic resin C 1. The mixture is then neutralized with 3 g of 2 dimethylamino-2 methylpropanol (80% in water) and diluted to 1 liter with deionized water.

Ratio of the components (solid to solid)
 A1: A2 B1:C1 = 51:19:12:18

The following Table relates to the above three examples of aqueous, heat-cured coating materials of the invention. Their processing, as well as some properties of the coatings achievable with them are listed.

This bath liquids, obtained in the examples, were filled into a deep-drawn, stretched, two-part beverage can of tin plated steel plate with a diameter of 65 mm and a height of 112 mm. The edged can, printed on the outside, was connected in the circuit as anode over its base. A circular rod of rustproof steel, 6 mm in diameter, which was immersed to a depth of about 60 mm in the center of the can, functioned as cathode.

TABLE

| | Example 1 | Example 2 | Example 3 |
|---|---|---|---|
| Solids content (25 min. 180° C.) | 15.5 wt. % | 10.0 wt. % | 15.0 wt. % |
| MEQ value - milliequivalents per 100 g of solid resin | about 35 | about 35 | about 40 |
| pH | 7.8 | 8.4 | 8.6 |
| Bath conductivity | 990 μS/cm | 1190 μS/cm | 1505 μS/cm |
| Deposition Conditions | | | |
| Bath temperature | 26° C. | 21° C. | 25° C. |
| Deposition time | 15 sec | 15 sec | 16.3 sec |
| Deposition voltage | 100 V | 70 V | 100 V |
| Deposition equivalent | 40 C/g | 44 C/g | 47 C/g |
| Stoving temperature for a 5-min stoving time | 225° C. | 225° C. | 225° C. |
| Amount deposited on can | 250 mg/can | 230 mg/can | 234 mg/can |
| Test Values | | | |
| Current conduction at 4 V, measured 30 min in a can filled with electrolyte (porosity) | 0 mA | 0.5 mA | 0 mA |
| Surface nature (optical evaluation) | good | good | good |
| Adhesion after sterilization in water - 30 min at 85° C. | good | good | good |

TABLE-continued

| | Example 1 | Example 2 | Example 3 |
|---|---|---|---|
| Solvent retention in can, after thermal treatment, determined by gas chromatography | less than 0.5 mg/can | less than 0.5 mg/can | less than 0.5 mg/can |

We claim:

1. A method for coating a beverage or food can with an anticorrosive protective layer, comprising applying to a surface of said can an aqueous, heat-curable coating mixture of 40–85 weight percent based on resin solids of a component A, and 0–25 weight percent based on resin solids of a component B, and 5–40 weight percent based on resin solids of a component C as crosslinking agent, together with up to 20 weight percent based on the total weight of the coating mixture of an organic solvent, with or without conventional lacquer additives, pigments, and/or fillers, wherein the said ingredients:

Component A is a mixture of (i) 40–90 weight percent based on the mixture of a fatty acid-free, acidic epoxide resin phosphate ester having an acid number of 10 to 150, prepared by reaction between (a) an acid and (b) an epoxide group-containing polyglycidyl ether and/or a polyglycidyl (meth)acrylate resin, having more than 1.3 epoxide groups per molecule, and having an epoxide equivalent weight of 180 to 5,000, and (ii) 10–60 weight percent based on the mixture of a phenol-modified, carbonyl group-containing, oil-free polyester having an acid number of 15 to 175 and an OH-number of 15 to 175 and prepared by reaction of (a) a polyester polyol or a hydroxyl group-containing precondensate of a polyester polyol, with a hydroxyl group-containing phenol ether, or (b) an oil-free polyester with a mononuclear or a polynuclear phenol and with aldehyde, or (c) a resol from a mono- and/or a polynuclear phenol with a carboxyl group-containing polyester;

component B is an epoxide graft copolymer having an acid number of 30 to 200 which is the reaction product of (i) a fatty acid-free polyglycidyl ether having more than 1.3 epoxide groups per molecule and an epoxide equivalent weight of 1,000 to 5,000, with (ii) an $\alpha,\beta$-unsaturated monocarboxylic acid; and component C is a fully etherified amine-formaldehyde condensation resin and/or a fully etherified phenol-formaldehyde condensation resin having, on the average, at least 2 reactive sites per molecule; and curing the applied layer.

2. The method of claim 1, wherein component A is a mixture of 40 to 80 weight percent of a fatty acid-free, acidic epoxide resin phosphate ester with an acid number of 10 to 30 and 20 to 60 weight percent of a phenolic resin-modified, carboxyl group-containing, oil-free polyester with an acid number of 35 to 70.

3. The method of claim 1, wherein the component A is 50 to 85 weight percent of an epoxide resin phosphate ester with an acid number of 12 to 30, 5 to 20 weight percent of a phenolic resin-modified, oil-free polyester with an acid number of 35 to 70, and component C is 10 to 40 weight percent of a phenol-formaldehyde condensation resin and/or a melamine-formaldehyde condensation resin.

4. The method of claim 1, wherein compound A is 40 to 70 weight percent of an epoxide resin phosphate ester with an acid number of 12 to 30, 10 to 20 weight percent of a phenolic resin-modified, oil-free polyester with an acid number of 35 to 70, Component B is 10 to 20 weight percent of an epoxide resin graft copolymer with an acid number of 65 to 110 and Component C is 10 to 20 weight percent of a phenol-formaldehyde condensation resin and/or an amine-formaldehyde condensation resin.

5. The method of claim 1, wherein said cans are coated by anodic electrode position.

6. The method of claim 1, wherein the concentration of component B is 5 to 25 weight percent.

7. The method of claim 1, wherein the concentration of component A is 75 to 45 weight percent, of component B is 10 to 20 weight percent and of component C is 10 to 35 weight percent.

8. The method of claim 1, wherein the epoxide equivalent weight in component B is 1,000 to 3,000.

* * * * *